US007809579B2

(12) United States Patent
Bruhn et al.

(10) Patent No.: US 7,809,579 B2
(45) Date of Patent: Oct. 5, 2010

(54) FIDELITY-OPTIMIZED VARIABLE FRAME LENGTH ENCODING

(75) Inventors: Stefan Bruhn, Sollentuna (SE); Ingemar Johansson, Luleå (SE); Anisse Taleb, Kista (SE); Daniel Enström, Gammelstad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1202 days.

(21) Appl. No.: 11/011,765

(22) Filed: Dec. 15, 2004

(65) Prior Publication Data

US 2005/0149322 A1 Jul. 7, 2005

Related U.S. Application Data

(60) Provisional application No. 60/530,651, filed on Dec. 19, 2003.

(30) Foreign Application Priority Data

Feb. 20, 2004 (SE) .................................... 0400417

(51) Int. Cl.
*G10L 19/00* (2006.01)
*G10L 15/00* (2006.01)

(52) U.S. Cl. ....................... 704/500; 704/230; 704/239; 704/501

(58) Field of Classification Search ................. 704/211, 704/219, 500–504, 230, 201; 381/12, 307
See application file for complete search history.

(56) References Cited

U.S. PATENT DOCUMENTS 5,285,498 A 2/1994 Johnston
5,434,948 A * 7/1995 Holt et al. .................. 704/220

(Continued)

FOREIGN PATENT DOCUMENTS

EP 0497413 8/1992

(Continued)

OTHER PUBLICATIONS

L.R. Rabiner and R.W. Schafer. Digital Processing of Speech Signals. Upper Saddle River, New Jersey: Prentice Hall, Inc., 1978. pp. 116-130.*

(Continued)

*Primary Examiner*—Talivaldis Ivars Smits
*Assistant Examiner*—Matthew H Baker
(74) *Attorney, Agent, or Firm*—Nixon & Vanderhye P.C.

(57) ABSTRACT

Polyphonic signals are used to create a main signal, typically a mono signal, and a side signal. A number of encoding schemes for the side signal are provided. Each encoding scheme is characterized by a set of sub-frames of different lengths. The total length of the sub-frames corresponds to the length of the encoding frame of the encoding scheme. The encoding scheme to be used on the side signal is selected dependent on the present signal content of the polyphonic signals. In a preferred embodiment, a side residual signal is created as the difference between the side signal and the main signal scaled with a balance factor. The balance factor is selected to minimize the side residual signal. The optimized side residual signal and the balance factor are encoded and provided as encoding parameters representing the side signal.

28 Claims, 7 Drawing Sheets

U.S. PATENT DOCUMENTS

| | | | | |
|---|---|---|---|---|
| 5,694,332 | A | 12/1997 | Maturi | |
| 5,812,971 | A * | 9/1998 | Herre | 704/230 |
| 5,956,674 | A | 9/1999 | Smyth et al. | |
| 6,341,165 | B1 | 1/2002 | Gbur et al. | |
| 6,446,037 | B1 | 9/2002 | Fielder et al. | |
| 6,487,535 | B1 * | 11/2002 | Smyth et al. | 704/500 |
| 6,591,241 | B1 | 7/2003 | Absar et al. | |
| 7,340,391 | B2 | 3/2008 | Herre et al. | |
| 7,437,299 | B2 | 10/2008 | Aarts et al. | |
| 2003/0061055 | A1 | 3/2003 | Taori et al. | |
| 2003/0115041 | A1 | 6/2003 | Chen et al. | |
| 2003/0115052 | A1 | 6/2003 | Chen et al. | |
| 2004/0267543 | A1 | 12/2004 | Ojanpera | |
| 2005/0165611 | A1 | 7/2005 | Mehrotra et al. | |

FOREIGN PATENT DOCUMENTS

| | | |
|---|---|---|
| EP | 0965123 | 1/2003 |
| JP | 11-032399 | 2/1999 |
| JP | 2000-513888 | 10/2000 |
| JP | 2001-184090 | 7/2001 |
| JP | 2001-255892 | 9/2001 |
| JP | 2001-255899 | 9/2001 |
| JP | 2002-132295 | 5/2002 |
| JP | 2003-345398 | 12/2003 |
| WO | WO 97/47102 | 11/1997 |
| WO | 03/090206 | 10/2003 |

OTHER PUBLICATIONS

Herre, Jürgen; Brandenburg, Karlheinz; Lederer, D. Intensity Stereo Coding. AES Convention:96 (Feb. 1994) Paper No. 3799 Affiliation: Fraunhofer Gesellschaft, Institut fur Integrierte Schaltungen, Erlangen, Germany.*

Bosi, Marina; Brandenburg, Karlheinz; Quackenbush, Schuyler; Fielder, Louis; Akagiri, Kenzo; Fuchs, Hendrik; Dietz, Martin. ISO/IEC MPEG-2 Advanced Audio Coding. JAES vol. 45 Issue 10 pp. 789-814; Oct. 1997.*

Baumgarte, Frank; Faller, Christof. Why Binaural Cue Coding is Better than Intensity Stereo Coding. Media Signal Processing Research, Agere Systems, Murray Hill, NJ. AES Convention:112 (Apr. 2002) Paper No. 5575.*

Yang, Dai; Ai, Hongmei; Kyriakakis, Chris; Kuo, C.-C. Jay. An Inter-Channel Redundancy Removal Approach for High-Quality Multichannel Audio Compression. Affiliation: Integrated Media Systems Center, University of Southern California, Los Angeles, CA. AES Convention:109 (Sep. 2000) Paper No. 5238.*

Christof Faller and Frank Baumgarte; "Binaural Cue Coding Applied to Stereo and Multi-Channel Audio Compression;" Audio Engineering Society; Convention Paper 5574; 112$^{th}$ Convention, Munich, Germany, May 10-13, 2002; pp. 1-9.

International Search Report and Written Opinion mailed Mar. 17, 2005 in corresponding PCT Application PCT/SE2004/001867.

Japanese official action, dated May 7, 2008 in corresponding Japanese Application No. 2006-518596.

Summary of the Japanese official action, dated May 7, 2008 in corresponding Japanese Application No. 2006-518596.

Related U.S. Appl. No. 11/011,764, filed Dec. 15, 2004; Inventor: Taleb et al.

Christof Faller and Frank Baumgarte; "Efficient Representation of Spatial Audio Using Perceptual Parametrization;" Application of Signal Processing to Audio and Acoustics; 2001 IEEE Workshop on Publication date Oct. 21-24, 2001; pp. W2001-1 through W2001-4.

International Search Report and Written Opinion mailed Mar. 17, 2005 in corresponding PCT Application PCT/SE2004/001907.

Canadian official action, Jun. 17, 2008, in corresponding Canadian Application No. 2,527,971.

U.S. Appl. No. 11/358,726, filed Feb. 22, 2006; Inventor: Johansson et al.

Office Action mailed Feb. 18, 2009 in co-pending U.S. Appl. No. 11/358,726.

International Search Report and Written Opinion mailed Jun. 30, 2006 in corresponding PCT Application No. PCT/SE2006/000235.

3GPP Tech. Spec. TS 26.290, V6.1.0, 3$^{rd}$ Generation Partnership Project; Tech. Spec. Group Service and System Aspects; Audio Codec Processing Functions; Extended Adaptive Multi-Rate—Wideband (AMR-WB+) Codec; Transcoding Functions (Release 6), Dec. 2004.

C. Faller and F. Baumgarte; "Binaural Cue Coding Applied to Stereo and Multi-Channel Audio Compression;" AES 112$^{th}$ Convention Paper 5574; Munich, Germany; May 10-13, 2002.

B. Edler, C. Faller, and G. Schuller; "Perceptual Audio Coding Using a Time-Varying Linear Pre- and Post- Filter;" AES 109$^{th}$ Convention; Los Angeles; Sep. 22-25.

B. Bdler and G. Schuller; Audio Coding Using a Psychoacoustic Pre- and Post-Filter; pp. 881-884.

D. Bauer and D. Seitzer; "Statistical Properties of High Quality Stereo Signals in the Time Domain;" pp. 2045-2048.

Shyh-Shiaw Kuo and James D. Johnston; "A Study of Why Cross Channel Prediction is Not Applicable to Perceptual Audio Coding;" IEEE Signal Processing Letters, vol. 8, No. 9, Sep. 2001; pp. 245-247.

4.1.2 Symmetry and the LDL$^T$ Factorization; Chapter 4 Special Linear Systems; pp. 137-138.

Office action mailed Jul. 9, 2009 in co-pending U.S. Appl. No. 11/011,764.

Oomen, W. et al.; Advances in Parametric Coding for High-Quality Audio. Philips Digital Systems Laboratories, Eindhoven, The Netherlands; Philips Research Laboratories, Eindhoven, The Netherlands, AES Convention: 114 (Mar. 2003).

Translation of Japanese official action, Oct. 30, 2010, in corresponding Japanese Application No. 2007-216374.

* cited by examiner

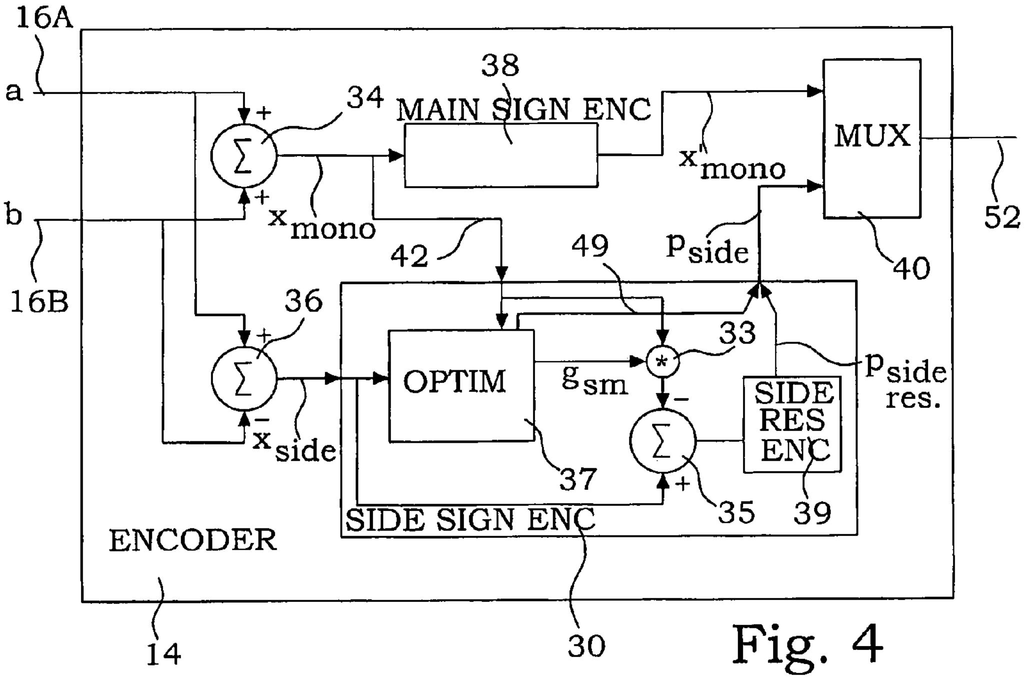
Fig. 4
Fig. 5
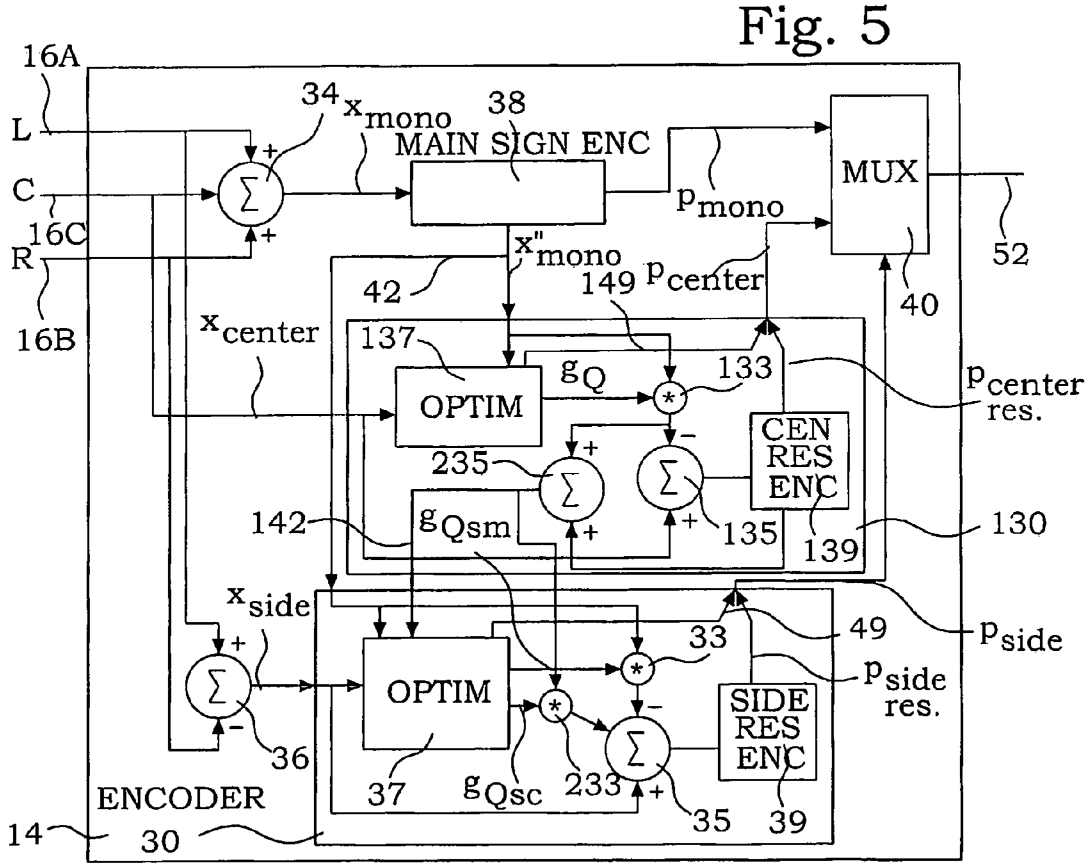

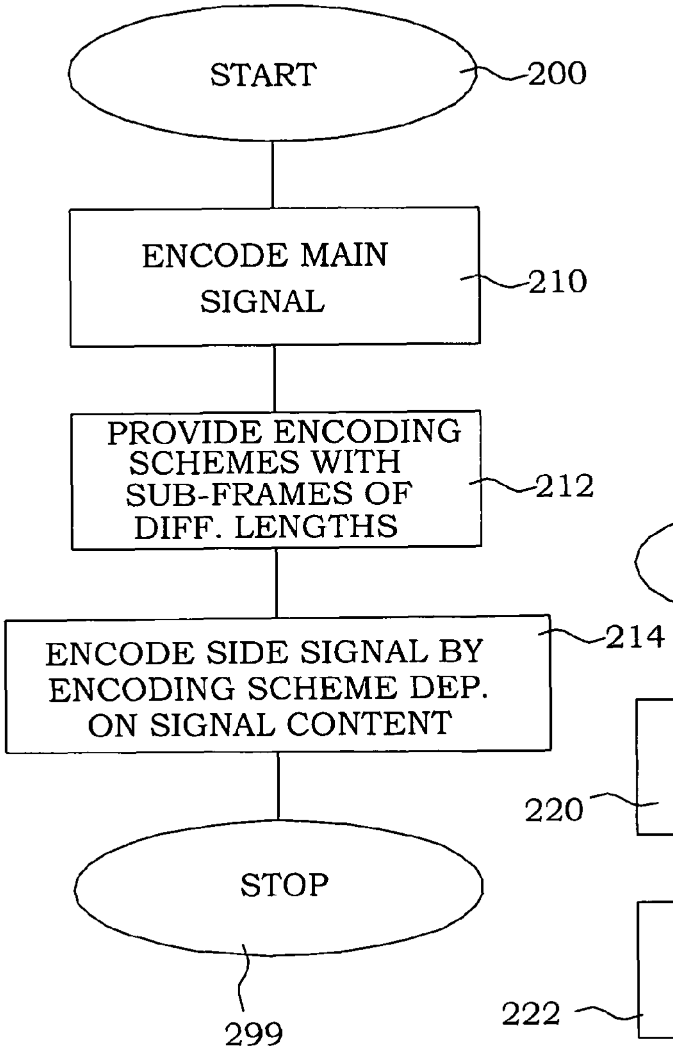
Fig. 10
Fig. 11
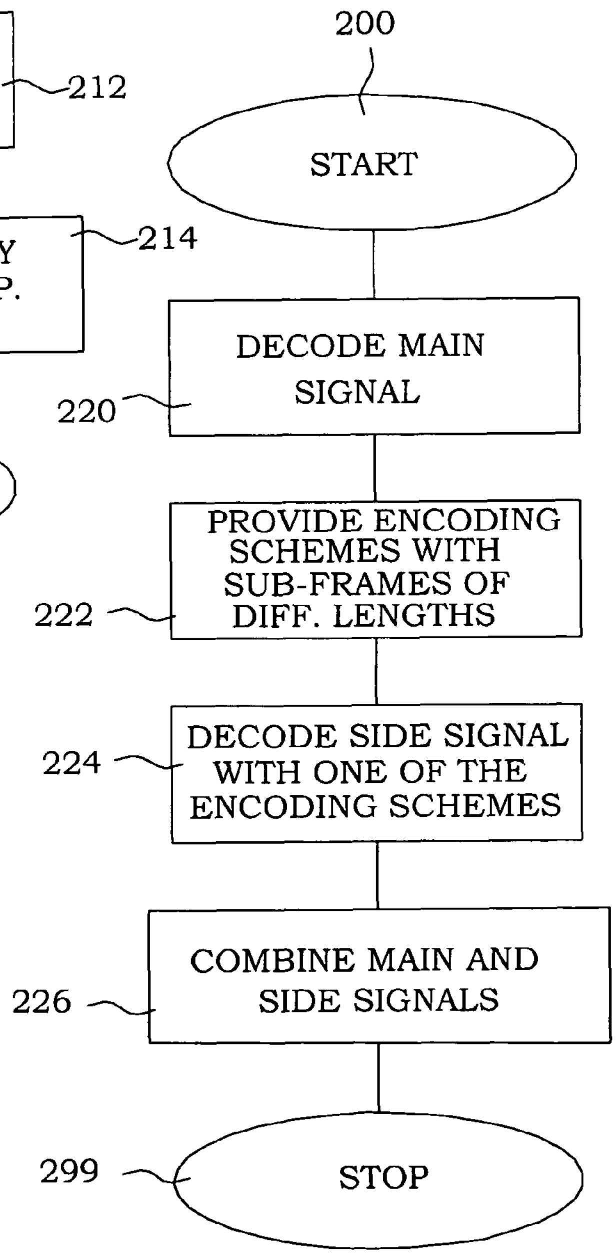

FIDELITY-OPTIMIZED VARIABLE FRAME LENGTH ENCODING

This application claims priority to and benefit of U.S. Provisional Application No. 60/530,651, filed Dec. 19, 2003 and Swedish Application Number 0400417-2, filed Feb. 20, 2004. The entire contents of these applications are incorporated herein by reference in its entirety.

TECHNICAL FIELD

The present invention relates in general to encoding of audio signals, and in particular to encoding of multi-channel audio signals.

BACKGROUND

There is a high market need to transmit and store audio signals at low bit rate while maintaining high audio quality. Particularly, in cases where transmission resources or storage is limited low bit rate operation is an essential cost factor. This is typically the case, e.g. in streaming and messaging applications in mobile communication systems such as GSM, UMTS, or CDMA.

Today, there are no standardized codecs available providing high stereophonic audio quality at bit rates that are economically interesting for use in mobile communication systems. What is possible with available codecs is monophonic transmission of the audio signals. To some extent also stereophonic transmission is available. However, bit rate limitations usually require limiting the stereo representation quite drastically.

The simplest way of stereophonic or multi-channel coding of audio signals is to encode the signals of the different channels separately as individual and independent signals. Another basic way used in stereo FM radio transmission and which ensures compatibility with legacy mono radio receivers is to transmit a sum and a difference signal of the two involved channels.

State-of-the-art audio codecs, such as MPEG-1/2 Layer III and MPEG-2/4 AAC make use of so-called joint stereo coding. According to this technique, the signals of the different channels are processed jointly, rather than separately and individually. The two most commonly used joint stereo coding techniques are known as "Mid/Side" (M/S) stereo coding and intensity stereo coding, which usually are applied on sub-bands of the stereo or multi-channel signals to be encoded.

M/S stereo coding is similar to the described procedure in stereo FM radio, in a sense that it encodes and transmits the sum and difference signals of the channel sub-bands and thereby exploits redundancy between the channel sub-bands. The structure and operation of an encoder based on M/S stereo coding is described, e.g. in U.S. Pat. No. 5,285,498 by J. D. Johnston.

Intensity stereo on the other hand is able to make use of stereo irrelevancy. It transmits the joint intensity of the channels (of the different sub-bands) along with some location information indicating how the intensity is distributed among the channels. Intensity stereo does only provide spectral magnitude information of the channels. Phase information is not conveyed. For this reason and since the temporal inter-channel information (more specifically the inter-channel time difference) is of major psycho-acoustical relevancy particularly at lower frequencies, intensity stereo can only be used at high frequencies above e.g. 2 kHz. An intensity stereo coding method is described, e.g. in the European patent 0497413 by R. Veldhuis et al.

A recently developed stereo coding method is described, e.g. in a conference paper with the title "Binaural cue coding applied to stereo and multi-channel audio compression", 112th AES convention, May 2002, Munich, Germany by C. Faller et al. This method is a parametric multi-channel audio coding method. The basic principle is that at the encoding side, the input signals from N channels $c_1$, $c_2$, . . . $c_N$ are combined to one mono signal m. The mono signal is audio encoded using any conventional monophonic audio codec. In parallel, parameters are derived from the channel signals, which describe the multi-channel image. The parameters are encoded and transmitted to the decoder, along with the audio bit stream. The decoder first decodes the mono signal m' and then regenerates the channel signals $c_1'$, $c_2'$, . . . , $c_N'$, based on the parametric description of the multi-channel image.

The principle of the Binaural Cue Coding (BCC) method is that it transmits the encoded mono signal and so-called BCC parameters. The BCC parameters comprise coded inter-channel level differences and inter-channel time differences for sub-bands of the original multi-channel input signal. The decoder regenerates the different channel signals by applying sub-band-wise level and phase adjustments of the mono signal based on the BCC parameters. The advantage over e.g. M/S or intensity stereo is that stereo information comprising temporal inter-channel information is transmitted at much lower bit rates. However, this technique requires computational demanding time-frequency transforms on each of the channels, both at the encoder and the decoder.

Moreover, BCC does not handle the fact that a lot of the stereo information, especially at low frequencies, is diffuse, i.e. it does not come from any specific direction. Diffuse sound fields exist in both channels of a stereo recording but they are to a great extent out of phase with respect to each other. If an algorithm such as BCC is subject to recordings with a great amount of diffuse sound fields the reproduced stereo image will become confused, jumping from left to right as the BCC algorithm can only pan the signal in specific frequency bands to the left or right.

A possible means to encode the stereo signal and ensure good reproduction of diffuse sound fields is to use an encoding scheme very similar to the technique used in FM stereo radio broadcast, namely to encode the mono (Left+Right) and the difference (Left−Right) signals separately.

A technique, described in U.S. Pat. No. 5,434,948 by C. E. Holt et al. uses a similar technique as in BCC for encoding the mono signal and side information. In this case, side information consists of predictor filters and optionally a residual signal. The predictor filters, estimated by a least-mean-square algorithm, when applied to the mono signal allow the prediction of the multi-channel audio signals. With this technique one is able to reach very low bit rate encoding of multi-channel audio sources, however, at the expense of a quality drop, discussed further below.

Finally, for completeness, a technique is to be mentioned that is used in 3D audio. This technique synthesizes the right and left channel signals by filtering sound source signals with so-called head-related filters. However, this technique requires the different sound source signals to be separated and can thus not generally be applied for stereo or multi-channel coding.

SUMMARY

A problem with existing encoding schemes based on encoding of frames of signals, in particular a main signal and one or more side signals, is that the division of audio information into frames may introduce unattractive perceptual artifacts. Dividing the information into frames of relative long duration generally reduces the average requested bit rate. This may be beneficial e.g. for music containing a large amount of diffuse sound. However, for transient rich music or speech, the fast temporal variations will be smeared out over the frame duration, giving rise to ghost-like sounds or even pre-echoing problems. Encoding short frames will instead give a more accurate representation of the sound, minimizing the energy, but requires higher transmission bit rates and higher computational resources. The coding efficiency as such may also decrease with very short frame lengths. The introduction of more frame boundaries may also introduce discontinuities in encoding parameters, which may appear as perceptual artifacts.

A further problem with schemes based on encoding of a main and one or several side signals is that they often require relatively large computational resources. In particular when short frames are used, handling discontinuities in parameters from one frame to another is a complex task. When long frames are used, estimation errors of transient sound may cause very large side signals, in turn increasing the transmission rate demand.

An object is therefore to provide an encoding method and device improving the perception quality of multi-channel audio signals, in particular to avoid artifacts such as pre-echoing, ghost-like sounds or frame discontinuity artifacts. A further object is to provide an encoding method and device requiring less processing power and having more constant transmission bit rate requirements.

The above objects are achieved by methods and devices according to the enclosed patent claims. In general words, polyphonic signals are used to create a main signal, typically a mono signal, and a side signal. The main signal is encoded, and a number of encoding schemes for the side signal are provided. Each encoding scheme is characterized by a set of sub-frames of different lengths. The total length of the sub-frames corresponds to the length of the encoding frame of the encoding scheme. The sets of sub-frames comprise at least one sub-frame. The encoding scheme to be used on the side signal is selected at least partly dependent on the present signal content of the polyphonic signals.

In one example embodiment, the selection takes place, before the encoding, based on signal characteristics analysis. In another example embodiment, the side signal is encoded by each of the encoding schemes, and based on measurements of the quality of the encoding, the best encoding scheme is selected.

In a preferred example embodiment, a side residual signal is created as the difference between the side signal and the main signal scaled with a balance factor. The balance factor is selected to minimize the side residual signal. The optimized side residual signal and the balance factor are encoded and provided as parameters representing the side signal. At the decoder side, the balance factor, the side residual signal and the man signal are used to recover the side signal.

In a further preferred example embodiment, the encoding of the side signal comprises an energy contour scaling in order to avoid pre-echoing effects. Furthermore, different encoding schemes may comprise different encoding procedures in the separate sub-frames.

An advantage with the technology is that the preservation of the perception of the audio signals is improved. Furthermore, the technology still allows multi-channel signal transmission at very low bit rates.

BRIEF DESCRIPTION OF THE DRAWINGS

FIG. 4 is a block diagram of an embodiment of an encoder using balance factor encoding of side signal;

FIG. 5 is a block diagram of an embodiment of an encoder for multi-signal systems;

FIG. 10 is a flow diagram of the basic steps of an example embodiment of an encoding method; and FIG. 11 is a flow diagram of the basic steps of an example embodiment of a decoding method.

DETAILED DESCRIPTION

Figure 1:
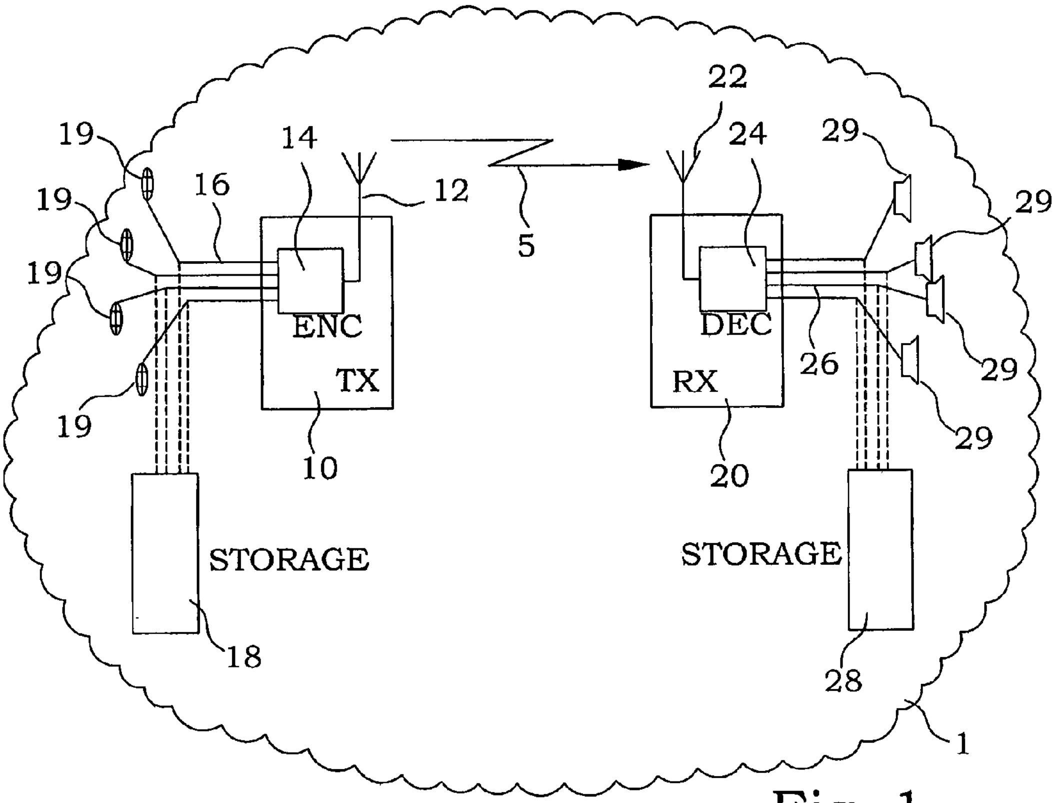
FIG. 1 is a block scheme of a system for transmitting polyphonic signals.

FIG. 1 illustrates a typical system 1, in which the technology in this case advantageously can be utilized. A transmitter 10 comprises an antenna 12 including associated hardware and software to be able to transmit radio signals 5 to a receiver 20. The transmitter 10 comprises among other parts a multi-channel encoder 14, which transforms signals of a number of input channels 16 into output signals suitable for radio transmission. Examples of suitable multi-channel encoders 14 are described in detail further below. The signals of the input channels 16 can be provided from e.g. an audio signal storage 18, such as a data file of digital representation of audio recordings, magnetic tape or vinyl disc recordings of audio etc. The signals of the input channels 16 can also be provided in "live", e.g. from a set of microphones 19. The audio signals are digitized, if not already in digital form, before entering the multi-channel encoder 14.

At the receiver 20 side, an antenna 22 with associated hardware and software handles the actual reception of radio signals 5 representing polyphonic audio signals. Here, typical functionalities, such as e.g. error correction, are performed. A decoder 24 decodes the received radio signals 5 and transforms the audio data carried thereby into signals of a number of output channels 26. The output signals can be provided to e.g. loudspeakers 29 for immediate presentation, or can be stored in an audio signal storage 28 of any kind.

The system 1 can for instance be a phone conference system, a system for supplying audio services or other audio applications. In some systems, such as e.g. the phone conference system, the communication has to be of a duplex type, while e.g. distribution of music from a service provider to a subscriber can be essentially of a one-way type. The transmission of signals from the transmitter 10 to the receiver 20 can also be performed by any other means, e.g. by different kinds of electromagnetic waves, cables or fibers as well as combinations thereof.

Figure 2A:
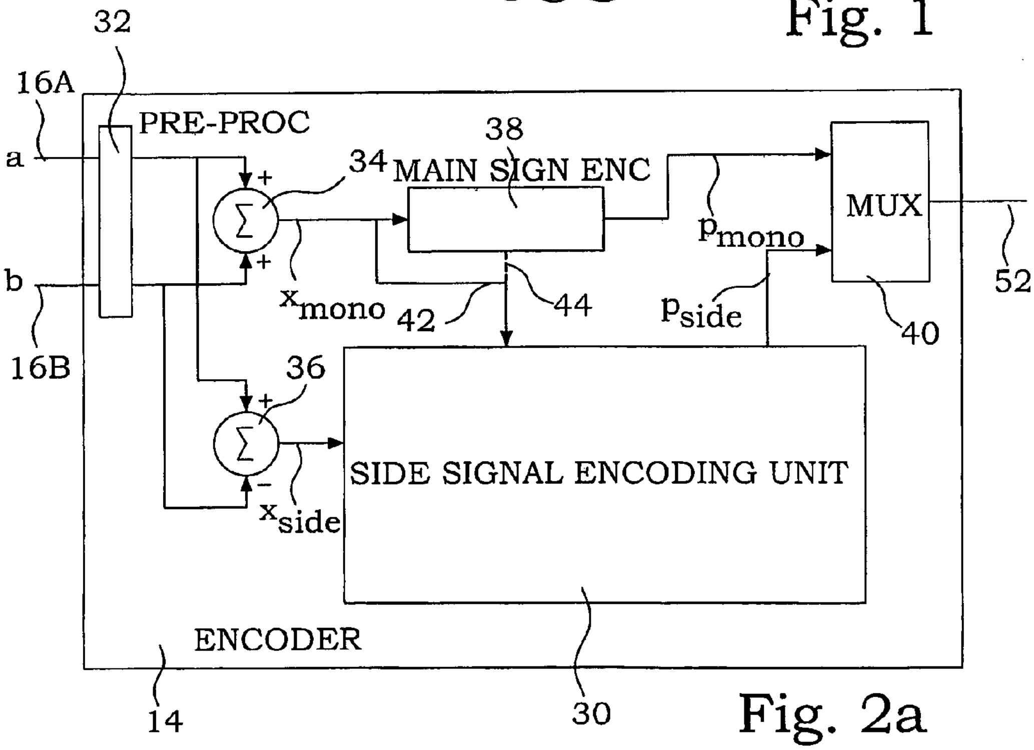
FIG. 2*a* is a block diagram of an encoder in a transmitter.

FIG. 2*a* illustrates an example embodiment of an encoder. In this embodiment, the polyphonic signal is a stereo signal comprising two channels a and b, received at input 16A and 16B, respectively. The signals of channel a and b are provided to a pre-processing unit 32, where different signal conditioning procedures may be performed. The (perhaps modified) signals from the output of the pre-processing unit 32 are summed in an addition unit 34. This addition unit 34 also divides the sum by a factor of two. The signal $x_{mono}$ produced in this way is a main signal of the stereo signals, since it basically comprises all data from both channels. In this embodiment the main signal thus represents a pure "mono" signal. The main signal $x_{mono}$ is provided to a main signal encoder unit 38, which encodes the main signal according to any suitable encoding principles. The main signal encoder unit 38 gives an output signal $p_{mono}$, being encoding parameters representing a main signal.

In a subtraction unit 36, a difference (divided by a factor of two) of the channel signals is provided as a side signal $x_{side}$. In this example embodiment, the side signal represents the difference between the two channels in the stereo signal. The side signal $x_{side}$ is provided to a side signal encoding unit 30. Preferred example embodiments of the side signal encoding unit 30 will be discussed further below. According to a side signal encoding procedure, which will be described more in detail further below, the side signal $x_{side}$ is transferred into encoding parameters $p_{side}$ representing a side signal $x_{side}$. In certain example embodiments, this encoding takes place utilizing also information of the main signal $x_{mono}$. The arrow 42 indicates such a provision, where the original uncoded main signal $x_{mono}$ is utilized. In further other example embodiments, the main signal information that is used in the side signal encoding unit 30 can be deduced from the encoding parameters $p_{mono}$ representing the main signal, as indicated by the broken line 44.

The encoding parameters $p_{mono}$ representing the main signal $x_{mono}$ is a first output signal, and the encoding parameters $p_{side}$ representing the side signal $x_{side}$ is a second output signal. In a typical case, these two output signals $p_{mono}$, $p_{side}$, together representing the full stereo sound, are multiplexed into one transmission signal 52 in a multiplexor unit 40. However, in other embodiments, the transmission of the first and second output signals $p_{mono}$, $p_{side}$ may take place separately.

Figure 2B:
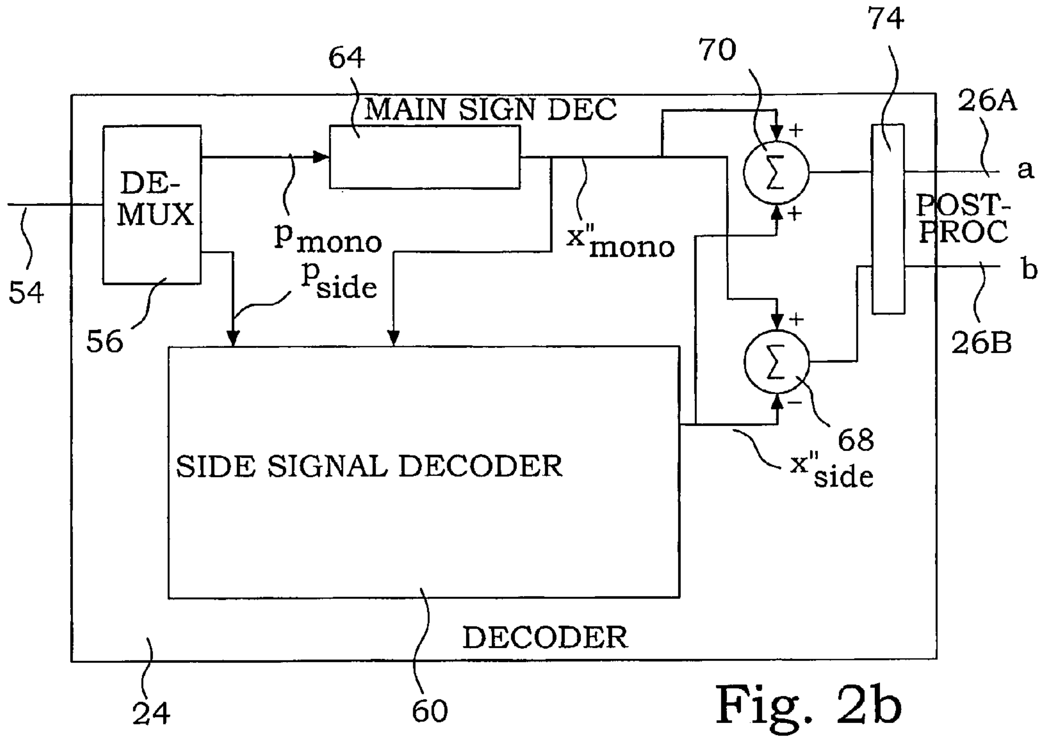
FIG. 2*b* is a block diagram of a decoder in a receiver.

In FIG. 2*b*, an example embodiment of a decoder 24 is illustrated as a block scheme. The received signal 54, comprising encoding parameters representing the main and side signal information are provided to a demultiplexor unit 56, which separates a first and second input signal, respectively. The first input signal, corresponding to encoding parameters $p_{mono}$ of a main signal, is provided to a main signal decoder unit 64. In a conventional manner, the encoding parameters $p_{mono}$ representing the main signal are used to generate an decoded main signal $x''_{mono}$, being as similar to the main signal $x_{mono}$ (FIG. 2*a*) of the encoder 14 (FIG. 2*a*) as possible.

Similarly, the second input signal, corresponding to a side signal, is provided to a side signal decoder unit 60. Here, the encoding parameters $p_{side}$ representing the side signal are used to recover a decoded side signal $x''_{side}$. In some embodiments, the decoding procedure utilizes information about the main signal $x''_{mono}$, as indicated by an arrow.

The decoded main and side signals $x''_{mono}$, $x''_{side}$ are provided to an addition unit 70, which provides an output signal that is a representation of the original signal of channel a. Similarly, a difference provided by a subtraction unit 68 provides an output signal that is a representation of the original signal of channel b. These channel signals may be post-processed in a post-processor unit 74 according to prior-art signal processing procedures. Finally, the channel signals a and b are provided at the outputs 26A and 26B of the decoder.

Figure 3A:
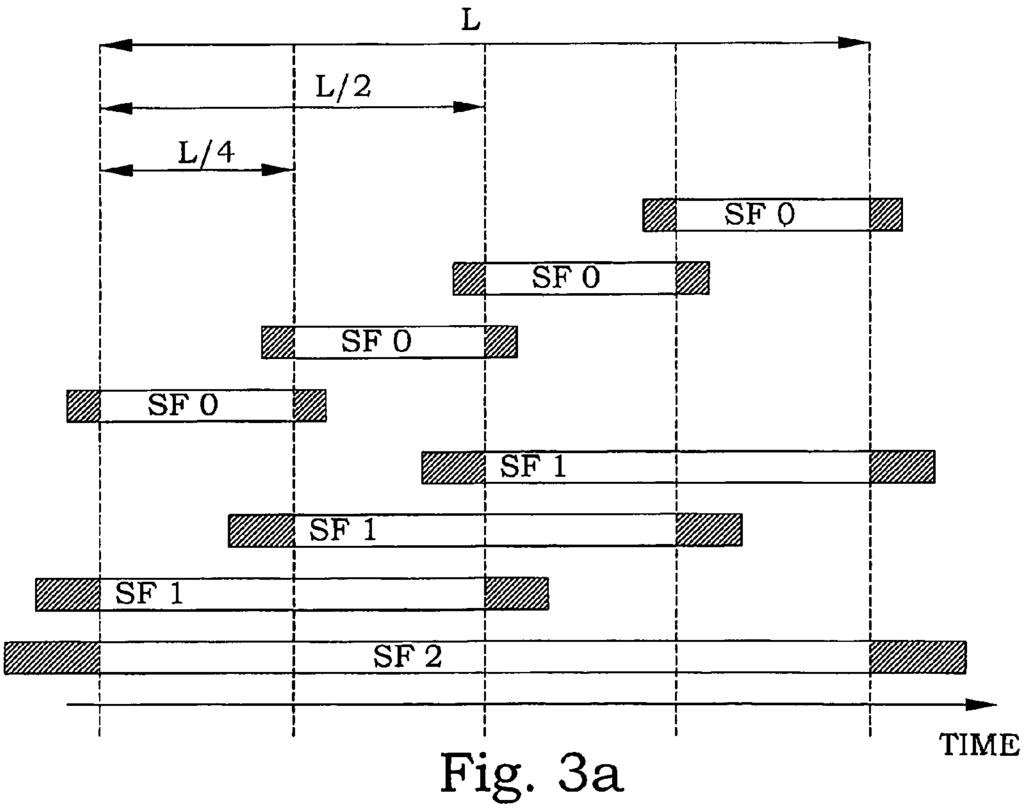
FIG. 3*a* is a diagram illustrating encoding frames of different lengths.

As mentioned in the summary, encoding is typically performed in one frame at a time. A frame comprises audio samples within a pre-defined time period. In the bottom part of FIG. 3*a*, a frame SF2 of time duration L is illustrated. The audio samples within the unhatched portion are to be encoded together. The preceding samples and the subsequent samples are encoded in other frames. The division of the samples into frames will in any case introduce some discontinuities at the frame borders. Shifting sounds will give shifting encoding parameters, changing basically at each frame border. This will give rise to perceptible errors. One way to compensate somewhat for this is to base the encoding, not only on the samples that are to be encoded, but also on samples in the absolute vicinity of the frame, as indicated by the hatched portions. In such a way, there will be a softer transfer between the different frames. As an alternative, or complement, interpolation techniques are sometimes also utilized for reducing perception artifacts caused by frame borders. However, all such procedures require large additional computational resources, and for certain specific encoding techniques, it might also be difficult to provide it with any resources.

In this view, it is beneficial to utilize as long frames as possible, since the number of frame borders will be small. Also the coding efficiency typically becomes high and the necessary transmission bit-rate will typically be minimized. However, long frames give problems with pre-echo artifacts and ghost-like sounds.

By instead utilizing shorter frames, such as SF1 or even SF0, having the durations of L/2 and L/4, respectively, the coding efficiency may be decreased, the transmission bit-rate may have to be higher and the problems with frame border artifacts will increase. However, shorter frames suffer less from e.g. other perception artifacts, such as ghost-like sounds and pre-echoing. In order to be able to minimize the coding error as much as possible, one should use an as short frame length as possible.

The audio perception is improved by using a frame length for encoding of the side signal that is dependent on the present signal content. Since the influence of different frame lengths on the audio perception will differ depending on the nature of the sound to be encoded, an improvement can be obtained by letting the nature of the signal itself affect the frame length that is used. The frame lengths used for the main signal may or may not be equal to the frame lengths used for the side signal.

Due to small temporal variations, it may e.g. in some cases be beneficial to encode the side signal with use of relatively long frames. This may be the case with recordings with a great amount of diffuse sound field such as concert recordings. In other cases, such as stereo speech conversation, short frames are probably to prefer. The decision which frame length is to prefer can be performed in two basic ways.

Figure 3B:
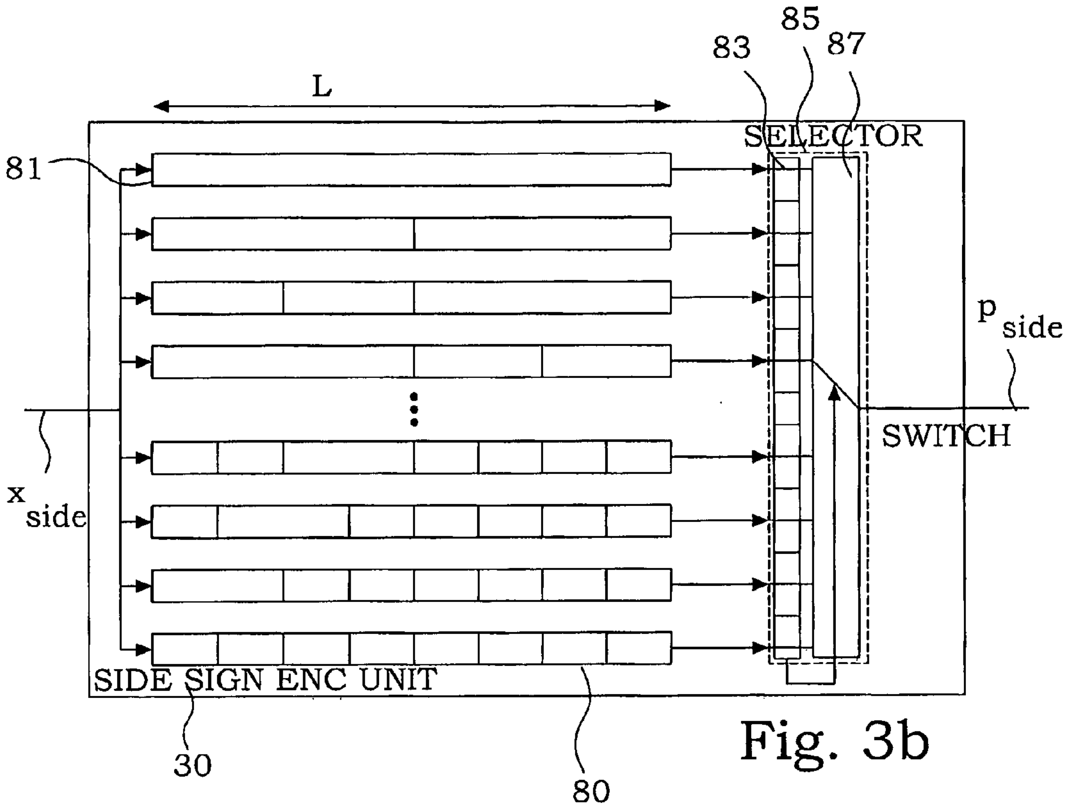
FIGS. 3*b* and 3*c* are block diagrams of example embodiments of side signal encoder units.

One example embodiment of a side signal encoder unit 30 is illustrated in FIG. 3*b*, in which a closed loop decision is utilized. A basic encoding frame of length L is used here. A number of encoding schemes 81, characterized by a separate set 80 of sub-frames, are created. Each set 80 of sub-frames comprises one or more sub-frames of equal or differing lengths. The total length of the set 80 of sub-frames is, however, always equal to the basic encoding frame length L. With references to FIG. 3*b*, the top encoding scheme is characterized by a set of sub-frames comprising only one sub-frame of length L. The next set of sub-frames comprises two frames of length L/2. The third set comprises two frames of length L/4 followed by a L/2 frame.

The signal $x_{side}$ provided to the side signal encoder unit 30 is encoded by all encoding schemes 81. In the top encoding scheme, the entire basic encoding frame is encoded in one piece. However, in the other encoding schemes, the signal $x_{side}$ is encoded in each sub-frame separately from each other. The result from each encoding scheme is provided to a selector 85. A fidelity measurement means 83 determines a fidelity measure for each of the encoded signals. The fidelity measure is an objective quality value, preferably a signal-to-noise measure or a weighted signal-to-noise ratio. The fidelity measures associated with each encoding scheme are compared and the result controls a switching means 87 to select the encoding parameters representing the side signal from the encoding scheme giving the best fidelity measure as the output signal $p_{side}$ from the side signal encoder unit 30.

Preferably, all possible combinations of frame lengths are tested and the set of sub-frames that gives the best objective quality, e.g. signal-to-noise ratio is selected.

In the present embodiment, the lengths of the sub-frames used are selected according to:

$$l_{sf}=l_f/2^n,$$

where $l_{sf}$ are the lengths of the sub-frames, $l_f$ is the length of the encoding frame and n is an integer. In the present embodiment, n is selected between 0 and 3. However, any frame lengths will be possible to use as long as the total length of the set is kept constant.

Figure 3C:
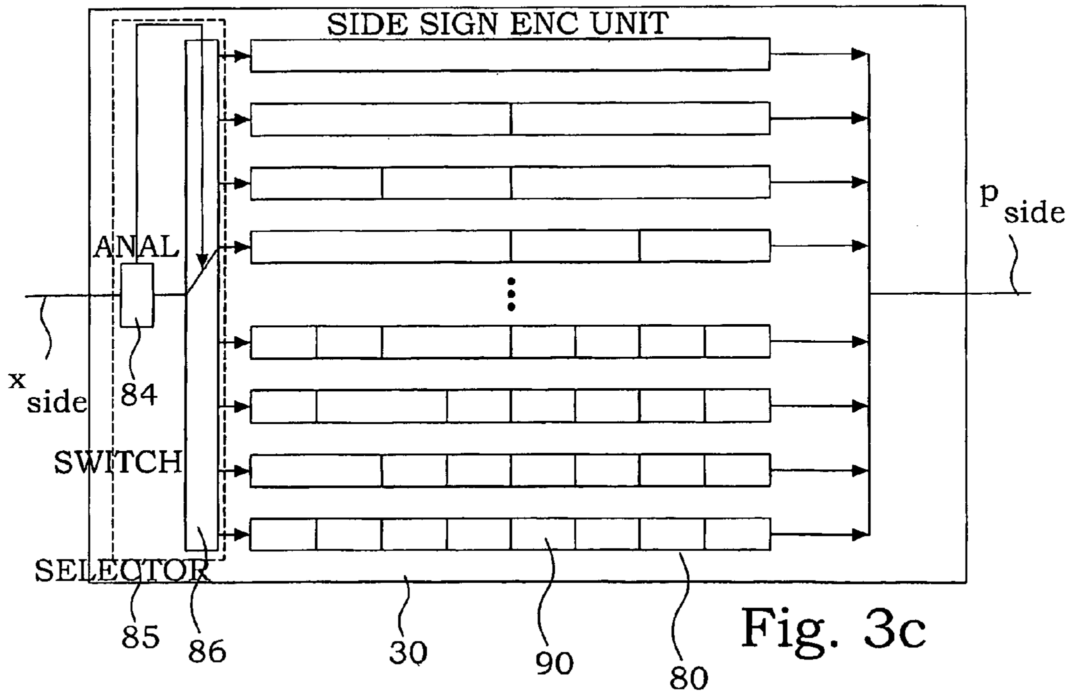

In FIG. 3*c*, another example embodiment of a side signal encoder unit 30 is illustrated. Here, the frame length decision is an open loop decision, based on the statistics of the signal. In other words, the spectral characteristics of the side signal will be used as a base for deciding which encoding scheme that is going to be used. As before, different encoding schemes characterized by different sets of sub-frames are available. However, in this embodiment, the selector 85 is placed before the actual encoding. The input side signal $x_{side}$ enters the selector 85 and a signal analyzing unit 84. The result of the analysis becomes the input of a switch 86, in which only one of the encoding schemes 81 are utilized. The output from that encoding scheme will also be the output signal $p_{side}$ from the side signal encoder unit 30.

The advantage with an open loop decision is that only one actual encoding has to be performed. The disadvantage is, however, that the analysis of the signal characteristics may be very complicated indeed and it may be difficult to predict possible behaviors in advance to be able to give an appropriate choice in the switch 86. A lot of statistical analysis of sound has to be performed and included in the signal analyzing unit 84. Any small change in the encoding schemes may turn upside down on the statistical behavior.

By using closed loop selection (FIG. 3*b*), encoding schemes may be exchanged without making any changes in the rest of the unit. On the other hand, if many encoding schemes are to be investigated, the computational requirements will be high.

The benefit with such a variable frame length coding for the side signal is that one can select between a fine temporal resolution and coarse frequency resolution on one side and coarse temporal resolution and fine frequency resolution on the other. The above embodiments will preserve the stereo image in the best possible manner.

There are also some requirements on the actual encoding utilized in the different encoding schemes. In particular when the closed loop selection is used, the computational resources to perform a number of more or less simultaneous encoding have to be large. The more complicated the encoding process is, the more computational power is needed. Furthermore, a low bit rate at transmission is also to prefer.

The method presented in U.S. Pat. No. 5,434,948, uses a filtered version of the mono (main) signal to resemble the side or difference signal. The filter parameters are optimized and allowed to vary in time. The filter parameters are then transmitted representing an encoding of the side signal. In one example embodiment, also a residual side signal is transmitted. In many cases, such an approach would be possible to use as side signal encoding method. This approach has, however, some disadvantages. The quantization of the of the filter coefficients and any residual side signal often require relatively high bit rates for transmission, since the filter order has to be high to provide an accurate side signal estimate. The estimation of the filter itself may be problematic, especially in cases of transient rich music. Estimation errors will give a modified side signal that is sometimes larger in magnitude than the unmodified signal. This will lead to higher bit rate demands. Moreover, if a new set of filter coefficients are computed every N samples, the filter coefficients need to be interpolated to yield a smooth transition from one set of filter coefficients to another, as discussed above. Interpolation of filter coefficients is a complex task and errors in the interpolation will manifest itself in large side error signals leading to higher bit rates needed for the difference error signal encoder.

A means to avoid the need for interpolation is to update the filter coefficients on a sample-by-sample basis and rely on backwards-adaptive analysis. For this to work well it is needed that the bit rate of the residual encoder is fairly high. This is therefore not a good alternative for low bit rate stereo coding.

There exist cases, e.g. quite common with music, where the mono and the difference signals are almost un-correlated. The filter estimation then becomes very troublesome with the added risk of just making things worse for the difference error signal encoder.

The solution according to U.S. Pat. No. 5,434,948 can work pretty well in cases where the filter coefficients vary very slowly in time, e.g. conference telephony systems. In the case of music signals, this approach does not work very well as the filters need to change very fast to track the stereo image. This means that sub-frame lengths of very differing magnitude has to be utilized, which means that the number of combinations to test increases rapidly. This in turn means that the requirements for computing all possible encoding schemes becomes impracticably high.

Therefore, in a preferred example embodiment, the encoding of the side signal is based on the idea to reduce the redundancy between the mono and side signal by using a simple balance factor instead of a complex bit rate consuming predictor filter. The residual of this operation is then encoded. The magnitude of such a residual is relatively small and does not call for very high bit rate need for transfer. This idea is very suitable indeed to combine with the variable frame set approach described earlier, since the computational complexity is low.

The use of a balance factor combined with the variable frame length approach removes the need for complex interpolation and the associated problems that interpolation may cause. Moreover, the use of a simple balance factor instead of a complex filter gives fewer problems with estimation as possible estimation errors for the balance factor has less impact. The preferred solution will be able to reproduce both panned signals and diffuse sound fields with good quality and with limited bit rate requirements and computational resources.

FIG. 4 illustrates a preferred example embodiment of a stereo encoder. This embodiment is very similar to the one shown in FIG. 2*a*, however, with the details of the side signal encoder unit 30 revealed. The encoder 14 of this embodiment does not have any pre-processing unit, and the input signals are provided directly to the addition and subtraction units 34, 36. The mono signal $x_{mono}$ is multiplied with a certain balance factor $g_{sm}$ in a multiplier 33. In a subtraction unit 35, the multiplied mono signal is subtracted from the side signal $x_{side}$, i.e. essentially the difference between the two channels, to produce a side residual signal. The balance factor $g_{sm}$ is determined based on the content of the mono and side signals by the optimizer 37 in order to minimize the side residual signal according to a quality criterion. The quality criterion is preferably a least mean square criterion. The side residual signal is encoded in a side residual encoder 39 according to any encoder procedures. Preferably, the side residual encoder 39 is a low bit rate transform encoder or a CELP (Codebook Excited Linear Prediction) encoder. The encoding parameters $p_{side}$ representing the side signal then comprises the encoding parameters $p_{side\ residual}$ representing the side residual signal and the optimized balance factor 49.

In the embodiment of FIG. 4, the mono signal 42 used for synthesizing the side signals is the target signal $x_{mono}$ for the mono encoder 38. As mentioned above (in connection with FIG. 2*a*), the local synthesis signal of the mono encoder 38 can also be utilized. In the latter case, the total encoder delay may be increased and the computational complexity for the side signal may increase. On the other hand, the quality may be better as it is then possible to repair coding errors made in the mono encoder.

In a more mathematical way, the basic encoding scheme can be described as follows. Denote the two channel signals as a and b, which may be the left and right channel of a stereo pair. The channel signals are combined into a mono signal by addition and to a side signal by a subtraction. In equation form, the operations are described as:

$$x_{mono}(n)=0.5(a(n)+b(n))$$

$$x_{side}(n)=0.5(a(n)-b(n)).$$

It is beneficial to scale the $x_{mono}$ and $x_{side}$ signals down by a factor of two. It is here implied that other ways of creating the $x_{mono}$ and $x_{side}$ exist. One can for instance use:

$$x_{mono}(n)=\gamma a(n)+(1-\gamma)b(n)$$

$$x_{side}(n)=\gamma a(n)-(1-\gamma)b(n)$$

$$0\leqq\gamma\leqq1.0.$$

On blocks of the input signals, a modified or residual side signal is computed according to:

$$x_{side\ residual}(n)=x_{side}(n)-f(x_{mono},x_{side})x_{mono}(n),$$

where $f(x_{mono},x_{side})$ is a balance factor function that based on the block on N samples, i.e. a sub-frame, from the side and mono signals strive to remove as much as possible from the side signal. In other words, the balance factor is used to minimize the residual side signal. In the special case where it is minimized in a mean square sense, this is equivalent to minimizing the energy of the residual side signal $x_{side\ residual}$.

In the above mentioned special case $f(x_{mono},x_{side})$ is described as:

$$f(x_{mono}, x_{side}) = \frac{R_{sm}}{R_{mm}}$$

$$R_{mm} = \left[\sum_{n=frame\ start}^{frame\ end} x_{mono}(n)x_{mono}(n)\right]$$

$$R_{sm} = \left[\sum_{n=frame\ start}^{frame\ end} x_{side}(n)x_{mono}(n)\right],$$

where $x_{side}$ is the side signal and $x_{mono}$ is the mono signal. Note that the function is based on a block starting at "frame start" and ending at "frame end".

It is possible to add weighting in the frequency domain to the computation of the balance factor. This is done by convoluting the $x_{side}$ and $x_{mono}$ signals with the impulse response of a weighting filter. It is then possible to move the estimation error to a frequency range where they are less easy to hear. This is referred to as perceptual weighting.

A quantized version of the balance factor value given by the function $f(x_{mono},x_{side})$ is transmitted to the decoder. It is preferable to account for the quantization already when the modified side signal is generated. The expression below is then achieved:

$$x_{side\ residual}(n) = x_{side}(n) - g_Q x_{mono}(n)$$

$$g_Q = Q_g^{-1}\left(Q_g\left(\frac{R_{sm}}{R_{mm}}\right)\right).$$

$Q_g(..)$ is a quantization function that is applied to the balance factor given by the function $f(x_{mono},x_{side})$. The balance factor is transmitted on the transmission channel. In normal left-right panned signals the balance factor is limited to the interval [−1.0 1.0]. If on the other hand the channels are out of phase with regards to one another, the balance factor may extend beyond these limits.

As an optional means to stabilize the stereo image, one can limit the balance factor if the normalized cross correlation between the mono and the side signal is poor as given by the equation below:

$$g_Q = Q_g^{-1}\left(Q_g\left(\left|\underline{R}_{sm}\right|\frac{R_{sm}}{R_{mm}}\right)\right),$$

where $$\underline{R}_{sm} = \frac{R_{sm}}{\sqrt{R_{ss}\cdot R_{mm}}}$$

$$R_{sm} = \left[\sum_{n=frame\ start}^{frame\ end} x_{side}(n)x_{mono}(n)\right].$$

These situations occur quite frequently with e.g. classical music or studio music with a great amount of diffuse sounds, where in some cases the a and b channels might almost cancel out one another on occasions when a mono signal is created.

The effect on the balance factor is that is can jump rapidly, causing a confused stereo image. The fix above alleviates this problem.

The filter-based approach in U.S. Pat. No. 5,434,948 has the similar problems, but in that case the solution is not so simple.

If $E_s$ is the encoding function (e.g. a transform encoder) of the residual side signal and $E_m$ is the encoding function of the mono signal, then the decoded a" and b" signals in the decoder end can be described as (it is assumed here that γ=0.5).

$$a''(n)=(1+g_Q)x_{mono}''(n)+x_{side}''(n)$$

$$b''(n)=(1-g_Q)x_{mono}''(n)-x_{side}''(n)$$

$$x_{side}''=E_s^{-1}(E_s(x_{side\ residual}))$$

$$x_{mono}''=E_m^{-1}(E_m(x_{mono}))$$

One important benefit from computing the balance factor for each frame is that one avoids the use of interpolation. Instead, normally, as described above, the frame processing is performed with overlapping frames.

The encoding principle using balance factors operates particularly well in the case of music signals, where fast changes typically are needed to track the stereo image.

Lately, multi-channel coding has become popular. One example is 5.1 channel surround sound in DVD movies. The channels are there arranged as: front left, front center, front right, rear left, rear right and subwoofer. In FIG. 5, an embodiment of an encoder that encodes the three front channels in such an arrangement exploiting interchannel redundancies according to the present invention is shown.

Three channel signals L, C, R are provided on three inputs 16A-C, and the mono signal $x_{mono}$ is created by a sum of all three signals. A center signal encoder unit 130 is added, which receives the center signal $x_{centre}$. The mono signal 42 is in this embodiment the encoded and decoded mono signal $x''_{mono}$, and is multiplied with a certain balance factor $g_Q$ in a multiplier 133. In a subtraction unit 135, the multiplied mono signal is subtracted from the center signal $x_{centre}$, to produce a center residual signal. The balance factor $g_Q$ is determined based on the content of the mono and center signals by an optimizer 137 in order to minimize the center residual signal according to the quality criterion. The center residual signal is encoded in a center residual encoder 139 according to any encoder procedures. Preferably, the center residual encoder 139 is a low bit rate transform encoder or a CELP encoder. The encoding parameters $p_{centre}$ representing the center signal then comprises the encoding parameters $p_{centre\ residual}$ representing the center residual signal and the optimized balance factor 149. The center residual signal and the scaled mono signal are added in an addition unit 235, creating a modified center signal 142 being compensated for encoding errors.

The side signal $x_{side}$, i.e. the difference between the left L and right R channels is provided to the side signal encoder unit 30 as in earlier embodiments. However, here, the optimizer 37 also depends on the modified center signal 142 provided by the center signal encoder unit 130. The side residual signal will therefore be created as an optimum linear combination of the mono signal 42, the modified center signal 142 and the side signal in the subtraction unit 35.

The variable frame length concept described above can be applied on either of the side and center signals, or on both.

Figure 6:
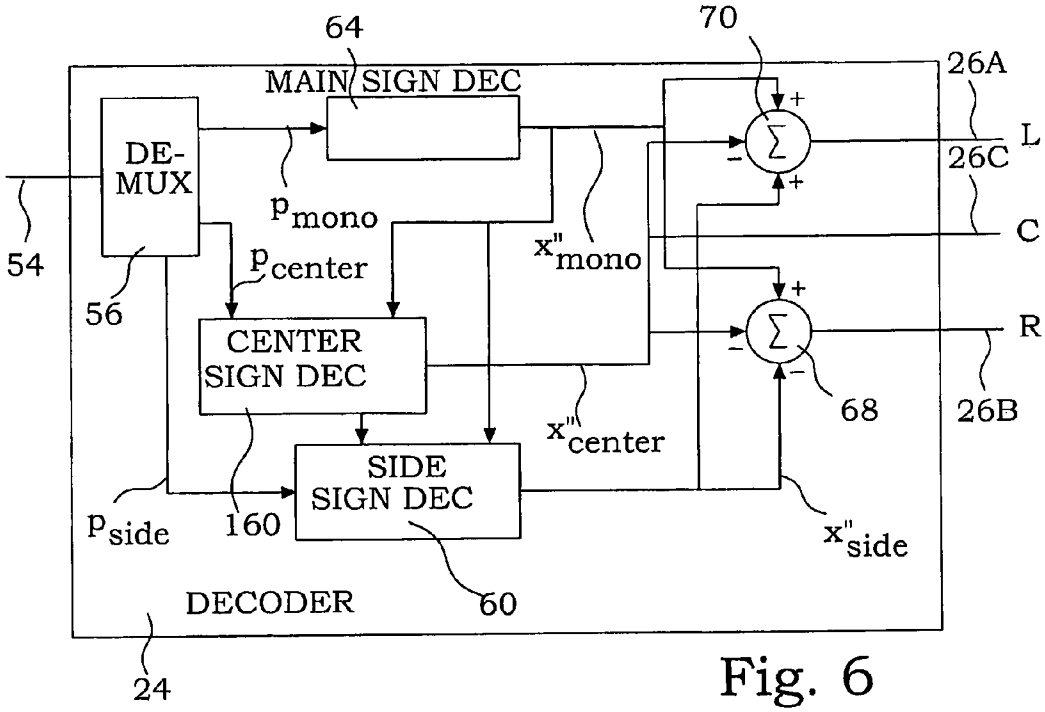
FIG. 6 is a block diagram of an embodiment of a decoder suitable for decoding signals from the device of FIG. 5.

FIG. 6 illustrates a decoder unit suitable for receiving encoded audio signals from the encoder unit of FIG. 5. The received signal 54 is divided into encoding parameters $p_{mono}$ representing the main signal, encoding parameters $p_{centre}$ representing the center signal and encoding parameters $p_{side}$ representing the side signal. In the decoder 64, the encoding parameters $p_{mono}$ representing the main signal are used to generate a main signal $x''_{mono}$. In the decoder 160, the encoding parameters $p_{centre}$ representing the center signal are used to generate a center signal $x''_{centre}$, based on main signal $x''_{mono}$. In the decoder 60, the encoding parameters $p_{side}$ representing the side signal are decoded, generating a side signal $x''_{side}$, based on main signal $x''_{mono}$ and center signal $x''_{centre}$.

The procedure can be mathematically expressed as follows:

The input signals $x_{left}$, $x_{right}$ and $x_{centre}$ are combined to a mono channel according to:

$$x_{mono}(n)=\alpha x_{left}(n)+\beta x_{right}(n)+\chi x_{centre}(n).$$

α, β and χ are in the remaining section set to 1.0 for simplicity, but they can be set to arbitrary values. The α, β and χ values can be either constant or dependent of the signal contents in order to emphasize one or two channels in order to achieve an optimal quality.

The normalized cross correlation between the mono and the center signal is computed as:

$$\underline{R}_{cm} = \frac{R_{cm}}{\sqrt{R_{cc}\cdot R_{mm}}},$$

where $$R_{cc} = \left[\sum_{n=frame\ start}^{frame\ end} x_{centre}(n)x_{centre}(n)\right]$$

$$R_{mm} = \left[\sum_{n=frame\ start}^{frame\ end} x_{mono}(n)x_{mono}(n)\right]$$

$$R_{cm} = \left[\sum_{n=frame\ start}^{frame\ end} x_{centre}(n)x_{mono}(n)\right].$$

$x_{centre}$ is the center signal and $x_{mono}$ is the mono signal. The mono signal comes from the mono target signal but it is possible to use the local synthesis of the mono encoder as well.

The center residual signal to be encoded is:

$$x_{centreresidual}(n) = x_{centre}(n) - g_Q x_{mono}(n)$$

$$g_Q = Q_g^{-1}\left(Q_g\left(\frac{R_{cm}}{R_{mm}}\right)\right).$$

$Q_g(..)$ is a quantization function that is applied to the balance factor. The balance factor is transmitted on the transmission channel.

If $E_c$ is the encoding function (e.g. a transform encoder) of the center residual signal and $E_m$ is the encoding function of the mono signal then the decoded $x_{centre}''$ signal in the decoder end can be described as:

$$x_{centre}''(n)=g_Q x_{mono}''(n)+x_{centre\ residual}''(n)$$

$$x_{centre\ residual}''=E_c^{-1}(E_c(x_{centre\ residual}))$$

$$x_{mono}''=E_m^{-1}(E_m(x_{mono}))$$

The side residual signal to be encoded is:

$$x_{side\ residual}(n)=(x_{left}(n)-x_{right}(n))-g_{Qsm}x_{mono}''(n)-g_{Qsc}x_{centre}''(n),$$

where $g_{Qsm}$ and $g_{Qsc}$ are quantized values of the parameters $g_{sm}$ and $g_{sc}$ that minimizes the expression:

$$\sum_{n=frame\ start}^{frame\ end}[\,|\,(x_{left}(n)-x_{right}(n))-g_{sm}x''_{mono}(n)-g_{sc}x''_{centre}(n)\,|\,]^{\eta}.$$

η can for instance be equal to 2 for a least square minimization of the error. The $g_{sm}$ and $g_{sc}$ parameters can be quantized jointly or separately.

If $E_s$ is the encoding function of the side residual signal, then the decoded $x_{left}''$ and $x_{right}''$ channel signals are given as:

$$x_{left}''(n)=x_{mono}''(n)-x_{centre}''(n)+x_{side}''(n)$$

$$x_{right}''(n)=x_{mono}''(n)-x_{centre}''(n)-x_{side}''(n)$$

$$x_{side}''(n)=x_{side\ residual}+g_{Qsm}x_{mono}''(n)+g_{Qsc}x_{centre}''(n)$$

$$x_{side\ residual}=E_s^{-1}(E_s(x_{side\ residual})).$$

Figure 7A:
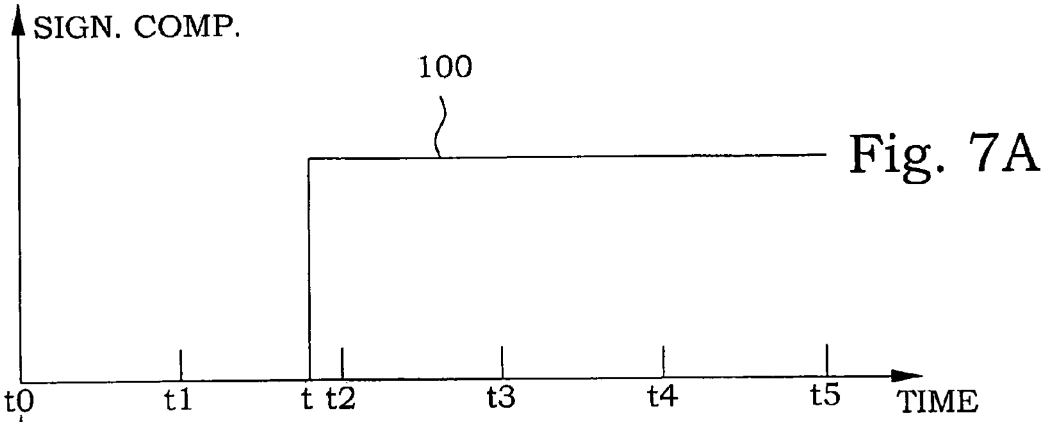
FIGS. 7*a* and *b* are diagrams illustrating a pre-echo artifact.
Figure 7B:
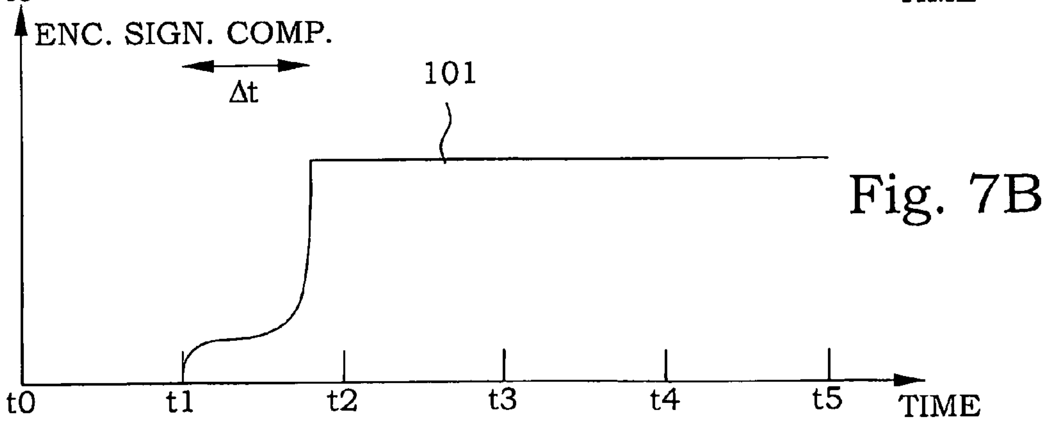

One of the perception artifacts that are most annoying is the pre-echo effect. In FIG. 7*a-b*, diagrams are illustrating such an artifact. Assume a signal component having the time development as shown by curve 100. In the beginning, starting from t0, the signal component is not present in the audio sample. At a time t between t1 and t2, the signal component suddenly appears. When the signal component is encoded, using a frame length of t2–t1, the occurrence of the signal component will be "smeared out" over the entire frame, as indicated in curve 101. If a decoding takes place of the curve 101, the signal component appears a time Δt before the intended appearance of the signal component, and a "pre-echo" is perceived.

The pre-echoing artifacts become more accentuated if long encoding frames are used. By using shorter frames, the artifact is somewhat suppressed. Another way to deal with the pre-echoing problems described above is to utilize the fact that the mono signal is available at both the encoder and decoder end. This makes it possible to scale the side signal according to the energy contour of the mono signal. In the decoder end, the inverse scaling is performed and thus some of the pre-echo problems may be alleviated.

An energy contour of the mono signal is computed over the frame as:

$$E_c(m)=\left[\sum_{n=m-L}^{m+L}w(n)x_{mono}^2(n)\right],\ \text{frame start}\le m\le\text{frame end},$$

where w(n) is a windowing function. The simplest windowing function is a rectangular window, but other window types such as a hamming window may be more desirable.

The side residual signal is then scaled as:

$$x_{side\ residual}(n)=\frac{x_{side\ residual}(n)}{\sqrt{E_c(n)}},\ \text{frame start}\le n\le\text{frame end}.$$

In a more general form the equation above can be written as:

$$x_{side\ residual}(n)=\frac{x_{side\ residual}(n)}{f(E_c(n))},\ \text{frame start}\le n\le\text{frame end},$$

where f(..) is a monotonic continuous function. In the decoder, the energy contour is computed on the decoded mono signal and is applied to the decoded side signal as:

$$\underline{x''}_{side}(n)=x_{side}''(n)f(E_c(n)),\ \text{frame start}\leqq n\leqq\text{frame end}.$$

Figure 8:
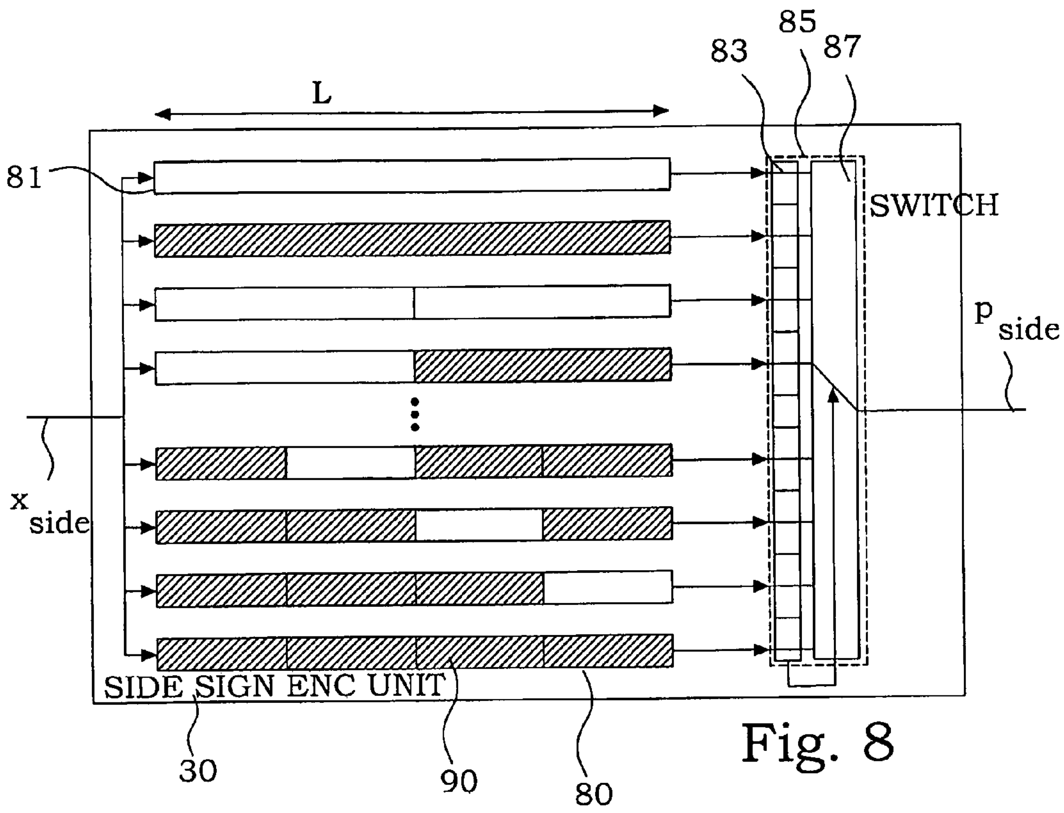
FIG. 8 is a block diagram of an example embodiment of a side signal encoder unit employing different encoding principles in different sub-frames.

Since this energy contour scaling in some sense is alternative to the use of shorter frame lengths, this concept is particularly well suited to be combined with the variable frame length concept, described further above. By having some encoding schemes that applies energy contour scaling, some that do not and some that applies energy contour scaling only during certain sub-frames, a more flexible set of encoding schemes may be provided. In FIG. 8, an embodiment of a signal encoder unit 30 according to the present invention is illustrated. Here, the different encoding schemes 81 comprise hatched sub-frames, representing encoding applying the energy contour scaling, and un-hatched sub-frames, representing encoding procedures not applying the energy contour scaling. In this manner, combinations not only of sub-frames of differing lengths, but sub-frames also of differing encoding principles are available. In the present explanatory example, the application of energy contour scaling differs between different encoding schemes. In a more general case, any encoding principles can be combined with the variable length concept in an analogous manner.

The set of encoding schemes of FIG. 8 comprises schemes that handle e.g. pre-echoing artifacts in different ways. In some schemes, longer sub-frames with pre-echoing minimization according to the energy contour principle are used. In other schemes, shorter sub-frames without energy contour scaling are utilized. Depending on the signal content, one of the alternatives may be more advantageous. For very severe pre-echoing cases, encoding schemes utilizing short sub-frames with energy contour scaling may be necessary.

The proposed solution can be used in the full frequency band or in one or more distinct sub bands. The use of sub-band can be applied either on both the main and side signals, or on one of them separately. A preferred embodiment comprises a split of the side signal in several frequency bands. The reason is simply that it is easier to remove the possible redundancy in an isolated frequency band than in the entire frequency band. This is particularly important when encoding music signals with rich spectral content.

One possible use is to encode the frequency band below a pre-determined threshold with the above method. The pre-determined threshold can preferably be 2 kHz, or even more preferably 1 kHz. For the remaining part of the frequency range of interest, one can either encode another additional frequency band with the above method, or use a completely different method.

Figure 9:
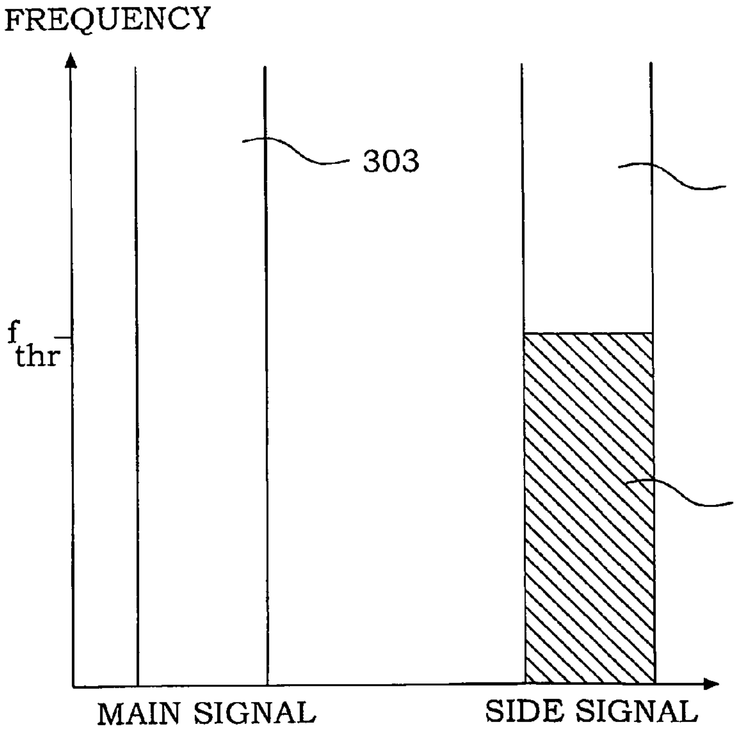
FIG. 9 illustrates the use of different encoding principles in different frequency sub-bands.

One motivation to use the above method preferably for low frequencies is that the diffuse sound fields generally have little energy content at high frequencies. The natural reason is that sound absorption typically increases with frequency. Also, the diffuse sound field components seem to play a less important role for the human auditory system at higher frequencies. Therefore, it is beneficial to employ this solution at low frequencies (below 1 or 2 kHz) and rely on other, even more bit efficient coding schemes at higher frequencies. The fact that the scheme is only applied at low frequencies gives a large saving in bit rate as the necessary bit rate with the proposed method is proportional to the required bandwidth. In most cases, the mono encoder can encode the entire frequency band, while the proposed side signal encoding is suggested to be performed only in the lower part of the frequency band, as schematically illustrated by FIG. 9. Reference number 301 refers to an encoding scheme according to the present invention of the side signal, reference number 302 refers to any other encoding scheme of the side signal and reference number 303 refers to an encoding scheme of the side signal.

There also exist the possibility to use the proposed method for several distinct frequency bands.

In FIG. 10, the main steps of an example embodiment of an encoding method. The procedure starts in step 200. In step 210, a main signal deduced from the polyphonic signals is encoded. In step 212, encoding schemes are provided, which comprise sub-frames with differing lengths and/or order. A side signal deduced in step 214 from the polyphonic signals is encoded by an encoding scheme selected dependent at least partly on the actual signal content of the present polyphonic signals. The procedure ends in step 299.

In FIG. 11, the main steps of an example embodiment of a decoding method are illustrated as a flow diagram. The procedure starts in step 200. In step 220, a received encoded main signal is decoded. In step 222, encoding schemes are provided, which comprise sub-frames with differing lengths and/or order. A received side signal is decoded in step 224 by a selected encoding scheme. In step 226, the decoded main and side signals are combined to a polyphonic signal. The procedure ends in step 299.

The embodiments described above are to be understood as a few illustrative examples. It will be understood by those skilled in the art that various modifications, combinations and changes may be made to the embodiments. In particular, different part solutions in the different embodiments can be combined in other configurations, where technically possible. The scope of the present invention is, however, defined by the appended claims.

The invention claimed is:

1. A method of encoding polyphonic signals in an encoder apparatus, comprising the steps of:

the encoder apparatus creating a main signal and a side signal as a first linear combination and a second different linear combination, respectively, of at least a first channel and a second channel, where each of the main signal and the side signal on their own represent a complete audio signal;

the side signal being different from the main signal;

the encoder apparatus generating a first output signal being encoding parameters representing the main signal;

the encoder apparatus generating a second output signal being encoding parameters representing the side signal within an encoding frame;

the encoder apparatus providing at least two side signal encoding schemes, each of the at least two side signal encoding schemes being characterized by a different respective set of sub-frames together constituting the encoding frame, wherein the sum of the lengths of the sub-frames in each encoding scheme is equal to the length of the encoding frame;

each set of sub-frames including at least one sub-frame; wherein:

the at least two side signal encoding schemes each encode the side signal into a set of sub-frames having a different sub-frame pattern;

the step of generating the second output signal comprises the step of selecting an encoding scheme from the at least two side signal encoding schemes, having a certain set of sub-frames, depending on a present signal content of the side signal; and the second output signal is encoded in each of the sub-frames of the selected set of sub-frames separately.

2. A method according to claim 1, wherein the step of generating the second output signal in turn comprises the steps of:

generating the encoding parameters representing the side signal within all sub-frames of each of the at least two sets of sub-frames separately;

calculating a total fidelity measure for each of the at least two side signal encoding schemes; and selecting the encoded signal from the encoding scheme having the best fidelity measure as the encoding parameters representing the side signal.

3. A method according to claim 2, wherein the fidelity measure is based on a signal-to-noise measure.

4. A method according to claim 1, wherein the sub-frames have lengths $l_{sf}$ according to:

$$l_{sf}=l_f/2^n,$$

where $l_f$ is the length of the encoding frame and n is an integer.

5. A method according to claim 4, wherein n is smaller than a predetermined value.

6. A method according to claim 5, wherein the at least two side signal encoding schemes comprise all permutations of sub-frame lengths.

7. A method according to claim 1, wherein the step of generating the second output signal in turn comprising the steps of:

creating a side residual signal as a difference between the side signal and the main signal scaled by a balance factor;

the balance factor being determined as the factor minimizing the side residual signal according to a quality criterion;

encoding the side residual signal and the balance factor into the encoding parameters representing the side signal.

8. A method according to claim 7, wherein the quality criterion is based on a least-mean-square measure.

9. A method according to claim 1, wherein the step of generating the second output signal further comprises the step of:

scaling the side signal to an energy contour of the main signal.

10. A method according to claim 9, wherein the scaling of the side signal is a division by a factor being a monotonic continuous function of the energy contour of the main signal.

11. A method according to claim 10, wherein the monotonic continuous function is a square root function.

12. A method according to claim 10, wherein the energy contour, $E_c$, of the main signal, $x_{mono}$, is computed over a sub-frame according to:

$$E_c(m)=\left[\sum_{n=m-L}^{m+L} w(n)x_{mono}^2(n)\right],\ \text{frame start} \le m \le \text{frame end}$$

where L is an arbitrary factor, n is a summing index, m is the sample within the sub-frame and w(n) is a windowing function.

13. A method according to claim 12, wherein the windowing function is a rectangular windowing function.

14. A method according to claim 12, wherein the windowing function is a hamming window function.

15. A method according to claim 1, wherein the at least two side signal encoding schemes comprise different encoding principles of the side signal.

16. A method according to claim 15, wherein at least a first encoding scheme of the at least two side signal encoding schemes comprises a first encoding principle for the side signal for all sub-frames and at least a second encoding scheme of the at least two side signal encoding schemes comprises a second encoding principle for the side signal for all sub-frames.

17. A method according to claim 15, wherein at least one encoding scheme of the at least two side signal encoding schemes comprises the first encoding principle for the side signal for one sub-frame and the second encoding principle for the side signal for another sub-frame.

18. A method according to claim 1, wherein the step of generating the second output signal in turn comprising the steps of:

analyzing spectral characteristics of the side signal;

selecting a set of sub-frames based on the analyzed spectral characteristics; and encoding the side signal within all sub-frames of the selected set of sub-frames separately.

19. A method according to claim 1, wherein the step of generating the second output signal is applied in a limited frequency band.

20. A method according to claim 19, wherein the step of generating the second output signal is applied only for frequencies below 2 kHz.

21. A method according to claim 20, wherein the step of generating the second output signal is applied only for frequencies below 1 kHz.

22. A method according to claim 1, wherein the polyphonic signals represent music signals.

23. A method of decoding polyphonic signals in a decoder apparatus, comprising the steps of:

the decoder apparatus decoding encoding parameters representing a main signal into a decoded main signal;

the decoder apparatus decoding encoding parameters representing a side signal within an encoding frame into a decoded side signal;

where each of the main signal and the side signal on their own represents a complete audio signal;

the decoder apparatus combining at least the decoded main signal and the decoded side signal in linear combinations into signals of at least a first and a second channel;

the decoder apparatus providing at least two side signal encoding schemes, each of the at least two side signal encoding schemes being characterized by a different respective set of sub-frames together constituting the encoding frame, wherein the sum of the lengths of the sub-frames in each encoding scheme is equal to the length of the encoding frame;

each set of sub-frames comprising at least one sub-frame;

wherein:

the at least two side signal encoding schemes each encode the side signal into a set of sub-frames having a different sub-frame pattern; and the step of decoding the encoding parameters representing the side signal in turn comprises the step of decoding the encoding parameters representing the side signal separately in the sub-frames of one of the at least two side signal encoding schemes.

24. Encoder apparatus, comprising:

input means for polyphonic signals comprising at least a first and a second channel, means for creating a main signal and a side signal as a first linear combination and a second different linear combination, respectively, of at least the first channel and the second channel, where each of the main signal and the side signal on their own represent a complete audio signal;

the side signal being different from the main signal;

means for generating a first output signal being encoding parameters representing the main signal;

means for generating a second output signal being encoding parameters representing the side signal within an encoding frame;

output means;

means for providing at least two side signal encoding schemes, each of the at least two side signal encoding schemes being characterized by a different respective set of sub-frames together constituting the encoding frame, wherein the sum of the lengths of the sub-frames in each side signal encoding scheme is equal to the length of the encoding frame;

each set of sub-frames side signal comprising at least one sub-frame;

wherein:

the at least two side signal encoding schemes each encode the side signal into a set of sub-frames having a different sub-frame pattern;

the means for generating the second output signal comprises means for selecting an encoding scheme from the at least two side signal encoding schemes, having a certain set of sub-frames, at least to a part dependent of the present signal content of the side signal; and means for encoding the side signal in each of the sub-frames of the selected encoding scheme separately.

25. Decoder apparatus, comprising:

input means for encoding parameters representing a main signal and encoding parameters representing a side signal;

means for decoding the encoding parameters representing the main signal into a decoded main signal;

means for decoding the encoding parameters representing the side signal within an encoding frame into a decoded side signal;

each of the main signal and the side signal on their own represents a complete audio signal;

means for combining at least the decoded main signal and the decoded side signal in linear combinations into signals of at least a first and a second channel; and output means;

wherein the means for decoding the encoding parameters representing the side signal comprises:

means for providing at least two side signal encoding schemes, each of the at least two side signal encoding schemes being characterized by a different respective set of sub-frames together constituting the encoding frame, wherein the sum of the lengths of the sub-frames in each side signal encoding scheme is equal to the length of the encoding frame;

each set of sub-frames comprising at least one sub-frame;

wherein the at least two side signal encoding schemes each encode the side signal into a set of sub-frames having a different sub-frame pattern; and means for decoding the encoding parameters representing the side signal separately in the sub-frames of one of the at least two side signal encoding schemes.

26. Audio system comprising at least one of:

an encoder apparatus comprising:

input means for polyphonic signals comprising at least a first and a second channel, means for creating a main signal and a side signal as a first linear combination and a second different linear combination, respectively, of at least the first channel and the second channel, where each of the main signal and the side signal on their own represent a complete audio signal;

the side signal being different from the main signal;

means for generating a first output signal being encoding parameters representing the main signal;

means for generating a second output signal being encoding parameters representing the side signal within an encoding frame;

output means;

means for providing at least two side signal encoding schemes, each of the at least two side signal encoding schemes being characterized by a different respective set of sub-frames together constituting the encoding frame, wherein the sum of the lengths of the sub-frames in each encoding scheme is equal to the length of the encoding frame;

each set of sub-frames comprising at least one sub-frame;

wherein the at least two side signal encoding schemes each encode the side signal into a set of sub-frames having a different sub-frame pattern;

wherein the means for generating the second output signal in turn comprises means for selecting an encoding scheme from the at least two side signal encoding schemes, having a certain set of sub-frames, at least in part dependent on the present signal content of the side signal; and means for encoding the side signal in each of the sub-frames of the selected encoded scheme separately, and a decoder apparatus comprising:

input means for encoding parameters representing a main signal and encoding parameters representing a side signal;

means for decoding the encoding parameters representing the main signal into a decoded main signal;

means for decoding the encoding parameters representing the side signal within an encoding frame into a decoded side signal;

means for combining at least the decoded main signal and the decoded side signal in linear combinations into signals of at least a first and a second channel; and output means;

wherein the means for decoding the encoding parameters representing the side signal comprises:

means for providing at least two side signal encoding schemes, each of the at least two side signal encoding schemes being characterized by a different respective set of sub-frames together constituting the encoding frame, wherein the sum of the lengths of the sub-frames in each side signal encoding scheme is equal to the length of the encoding frame;

each set of sub-frames comprising at least one sub-frame;

wherein the at least two side signal encoding schemes each encode the side signal into a set of sub-frames having a different sub-frame pattern; and means for decoding the encoding parameters representing the side signal separately in the sub-frames of one of the at least two side signal encoding schemes.

27. Encoder apparatus, comprising:

inputs arranged to receive polyphonic signals including at least a first and a second channel, a main signal encoder arranged to create a main signal as a first linear combination of at least the first channel and the second channel, where the main signal on its own represents a complete audio signal, and generate a first output signal including encoding parameters representing the main signal;

a side signal encoder arranged to create a side signal as a second different linear combination of at least the first channel and the second channel, where the side signal on its own represents a complete audio signal, and generate a second output signal being encoding parameters representing the side signal within an encoding frame;

the side signal being different from the main signal;

an output;

wherein the side signal encoder is arranged to provide at least two side signal encoding schemes, each of the at least two side signal encoding schemes including a different respective set of sub-frames together constituting the encoding frame, where the sum of the lengths of the sub-frames in each encoding scheme is equal to the length of the encoding frame;

wherein each set of sub-frames includes at least one sub-frame;

wherein the at least two side signal encoding schemes each encode the side signal into a set of sub-frames having a different sub-frame pattern;

wherein the side signal encoder includes a selector to select an encoding scheme from the at least two side signal encoding schemes having a certain set of sub-frames based on a signal content of the side signal; and wherein the side signal encoder is arranged to encode the side signal in each of the sub-frames of the selected encoding scheme separately.

28. Decoder apparatus, comprising:

a demultiplexor for receiving parameters representing a main signal and encoding parameters representing a side signal;

a main signal decoder arranged to a main signal and to decode the encoding parameters representing the main signal into a decoded main signal;

a side signal decoder for decoding the encoding parameters representing the side signal within an encoding frame into a decoded side signal;

each of the main signal and the side signal on their own represents a complete audio signal;

a combiner for combining at least the decoded main signal and the decoded side signal in linear combinations into signals of at least a first and a second channel; and output terminals, wherein the side signal decoder is arranged to:

provide at least two side signal encoding schemes, each of the at least two side signal encoding schemes including a different respective set of sub-frames together constituting the encoding frame, where the sum of the lengths of the sub-frames in each encoding scheme is equal to the length of the encoding frame;

each set of sub-frames comprising at least one sub-frame; and wherein the at least two side signal encoding schemes each encode the side signal into a set of sub-frames having a different sub-frame pattern; and decode the encoding parameters representing the side signal separately in the sub-frames of one of the at least two side signal encoding schemes.

* * * * *